UNITED STATES PATENT OFFICE.

PERCY R. MIDDLETON, OF LOS ANGELES, CALIFORNIA, ASSIGNOR OF ONE-HALF TO JOHN C. LALOR, OF NEW YORK, N. Y.

PROCESS OF ROASTING ORES OR CONCENTRATES.

1,376,025.   Specification of Letters Patent.   Patented Apr. 26, 1921.

No Drawing.   Application filed January 20, 1920. Serial No. 352,899.

*To all whom it may concern:*

Be it known that I, PERCY R. MIDDLETON, a subject of the King of Great Britain, residing at Los Angeles, in the county of Los Angeles and State of California, have invented new and useful Improvements in Processes of Roasting Ores or Concentrates, of which the following is a specification.

This invention is a novel process for the treatment of sulfur-bearing ores of copper, and such other metals (zinc, nickel, etc.) as form water-soluble sulfates; the object of the invention being to provide a roasting process in accordance with which substantially the entire valuable metal content of such ores may be converted into a condition of ready solubility either in water or in dilute sulfuric acid. In a typical operation in accordance with my invention, up to 85% of the total copper content of the ore is converted into water-soluble form, and 95–99% of the same is soluble in dilute acid solutions, although it is of course to be understood that the percentage recovery of metal will be subject to some variation with different ores. It is further characteristic of my process that the soluble iron content of the resulting calcine is extremely low, not as a rule exceeding 2 to 2½% by weight. This is of great technical importance, since the presence of iron in copper-bearing solutions is well understood to be a serious obstacle to the recovery of the copper metal. The calcines prepared in accordance with my process are eminently suited for leaching, preferably with dilute sulfuric acid solution, and the copper-bearing solutions thereby produced are amenable to treatment by electrolysis, or by other precipitation processes, particularly those of a cyclic character.

It has long been recognized that the sulfids of copper may be converted by roasting into sulfate and oxid; but so far as I am aware no satisfactory method has heretofore been devised for so conducting the roast that substantially the entire copper content of the ore is rendered soluble either in water or in dilute acid, without the formation in excessive quantities of soluble compounds of iron. In order that any leaching process may be of practical value it must be cyclic in character, with regeneration of the solvent; and the presence of considerable amounts of dissolved iron is either fatal to or highly objectionable in such regenerative operations, whether electrolytic or chemical.

My invention will be described by reference to a roasting operation applied to an ore carrying copper and iron as sulfids, although it is to be understood that the process is advantageously applied to other types of ore.

The copper sulfid ore or concentrate, which may also contain oxidized copper, is crushed to pass a 10 mesh or finer screen, and roasted in any suitable type of furnace under access of air and under conditions substantially as follows:

During the early stages of the roast or passage of the ore through the furnace, which period in the typical case under consideration may be taken as approximately 3 hours, the temperature is carefully maintained just below the so-called "ignition point" of the sulfur in the ore. By "ignition point" I mean that temperature at which a visible blue flame appears at the surface of the ore, this appearance usually coinciding substantially with the temperature at which the heat generated by oxidation of sulfur in the ore suffices to carry on the reaction without the supply of additional heat from an external source. It is essential to the present process that the ignition point should not be reached or exceeded. The precise temperature corresponding to this ignition point will however vary somewhat according to the nature of the ore and its sulfur content.

The roasting of the ore below the ignition point is continued for some hours, preferably at a substantially constant temperature which in the case of a typical iron-copper sulfid ore lies between 800° and 850° F. During this stage sulfur dioxid is generated and the direct oxidation of the copper and iron sulfids occurs presumably in accordance with the following equation:

(1) $3CuFeS_2 + O_{13} =$
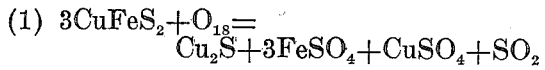
$Cu_2S + 3FeSO_4 + CuSO_4 + SO_2$

Following the completion of this direct oxidation the temperature is gradually increased to about 1100° F., further reactions occurring which may be expressed as follows:

(2) $Cu_2S + O_5 = CuSO_4 + CuO$
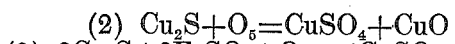
(3) $2Cu_2S + 2FeSO_4 + O_{11} = 4CuSO_4 + Fe_2O_3$
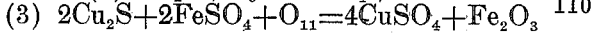

In practice the total roast is usually accomplished in approximately seven hours, the time being subject to some variation according to the nature and composition of the ore. A typical roasting schedule in accordance with my invention is as follows:

| | | |
|---|---|---|
| 1st hour | _____ | 750 to 800° F. |
| 2nd " | _____ | 800 to 850° F. |
| 3rd " | _____ | 850 |
| 4th " | _____ | 850 to 900° F. |
| 5th " | _____ | 900 to 1000° F. |
| 6th " | _____ | 1000 to 1100° F. |
| 7th " | _____ | 1100 to 1175° F. |

My process is chiefly intended for the treatment of sulfid ores, but a mixture of oxidized and sulfid ore may be treated with like results, provided the ore or ore-mixture contains sufficient iron sulfid to sulfatize the copper from the oxidized ore.

After roasting in the manner set forth above, the calcines may be leached and the solution electrolyzed or the copper precipitated by any approved method; the residue from the leaching operation may be treated by the cyanid or chlorination process in the event of the gold and silver values being sufficient to warrant extraction. As stated above my invention is not confined to the treatment of copper ores, but may be employed with advantage upon ores or concentrates of ores containing other metals (such as nickel, zinc, iron, silver and gold) and also containing sulfur.

It will be understood that the subsequent treatment of the roasted ore forms no part of the present invention. It is further to be understood that the invention is not restricted to the employment of the precise temperatures or other operating conditions above described. The term "ore" is applied herein to include concentrates and similar metallurgical products.

I claim:—

1. Process of roasting ores containing a metallic sulfid, comprising heating the ore with access of air to a reacting temperature below the ignition point of the sulfur in the ore; and maintaining such temperature until the maximum proportion of the sulfid of the metal to be recovered has been oxidized to sulfate.

2. Process of roasting ferruginous sulfid ores, comprising heating the ore with access of air to a reacting temperature below the ignition point of the sulfur in the ore; maintaining such temperature until the maximum proportion of the sulfid of the metal to be extracted has been oxidized to sulfate; and thereafter increasing the temperature to decompose iron sulfate while avoiding substantial decomposition of the sulfate of the metal to be extracted.

3. Process according to claim 1, wherein a ferruginous copper sulfid ore is roasted at a maintained temperature approximating 800–850° F. until the formation of copper sulfate has substantially attained the maximum.

4. Process according to claim 3 wherein the roasted ore is thereafter further heated to 1100–1200° F. to effect substantially complete decomposition of the sulfate of iron, with further sulfatizing of the copper content of the ore.

In testimony whereof I have signed my name to this specification.

PERCY R. MIDDLETON.